United States Patent [19]
Wilczak, Jr.

[11] Patent Number: 5,732,306
[45] Date of Patent: Mar. 24, 1998

[54] PRINTER ON-LINE DIAGNOSTICS FOR CONTINUOUS LOW FREQUENCY MOTION QUALITY DEFECTS

[75] Inventor: Fred F. Wilczak, Jr., Pittsford, N.Y.

[73] Assignee: Xerox Corporation, Stamford, Conn.

[21] Appl. No.: 617,450

[22] Filed: Mar. 18, 1996

[51] Int. Cl.$^6$ .............................. G03G 15/00; G01D 7/00
[52] U.S. Cl. .......................... 399/9; 399/36; 73/659; 340/683; 364/551.01
[58] Field of Search .......................... 355/203–207; 364/551.01, 551.02, 576; 324/161, 166; 73/659; 399/9, 26, 31, 36; 340/675, 679, 683

[56] References Cited

U.S. PATENT DOCUMENTS

| | | | |
|---|---|---|---|
| 4,341,995 | 7/1982 | Hennick | 324/161 |
| 4,425,798 | 1/1984 | Naigi et al. | 73/659 |
| 5,311,255 | 5/1994 | Josephson | 355/206 |
| 5,582,192 | 12/1996 | Williams, III | 131/280 |
| 5,679,900 | 10/1997 | Smulders | 73/659 |

*Primary Examiner*—Joan H. Pendegrass
*Attorney, Agent, or Firm*—T. L. Fair

[57] ABSTRACT

A method and apparatus for accurately and quickly enabling a technical representative to diagnose the source (or identify the component(s)) that is the root cause of the motion quality defect being experienced to reduce down time of the printing machine. The output of an encoder on the photoreceptor, electronically measured, translates variations in the photoreceptor velocity into voltage. The voltage is then converted into frequency, using a Fast Fourier Transform, for comparison to a predetermined set of frequencies associated with defective drive components to identify the source of the motion quality defect.

20 Claims, 4 Drawing Sheets

PRINTER ON-LINE DIAGNOSTICS FOR CONTINUOUS LOW FREQUENCY MOTION QUALITY DEFECTS

BACKGROUND OF THE INVENTION

This invention relates generally to an electrophotographic printing machine, and more particularly concerns a method for quick and accurate diagnosis of the source of motion quality defects.

Presently, motion quality problem sources are identified on print engines in the customer environment by the technical representative running halftone prints and then measuring the spatial distance between the bands that appear on these prints. Because each drives component generates its own characteristic frequency, the technical representative can take the measured spatial frequency to a table and look up the defective component. This measurement is often subjective due to the difficulty involved in measuring the small spatial differences between the bands in the halftone. This level of difficulty increases when more than one frequency is present on the print. When the spatial frequency is not measured accurately, the potential exists for the technical representative to replace the wrong component.

The following disclosures may be relevant to various aspects of the present invention and may be briefly summarized as follows:

Pending application, Ser. No.08/343,394, filed Nov. 22, 1994, entitled "Apparatus and Method for Precise Velocity Control" discloses an apparatus and method for precisely controlling a driven component in an electromechanical system, particularly for controlling the speed of a photoreceptor or intermediate transfer belt in an electrophotographic printing machine. A sensor monitors the speed of the driven belt and generates and sends a signal indicative thereof to a controller. A second sensor monitors the rotational speed of the drive motor for the component and also generates a signal indicative thereof and sends that signal to the controller. The controller processes the signals so that a preselected belt speed is maintained while minimizing or eliminating torque disturbances caused by the rapid fluctuation of the motor velocity without the necessity of using an inertial flywheel.

U.S. Pat. No. 5,313,253 discloses a sheet path velocity profile signature analysis apparatus which utilizes output from various idler rolls throughout the machine paper path to detect abnormalities. The constantly monitored and instantaneous velocity readings are compared with a base line velocity signature established at the factory. If the constantly monitored velocity profile is not within the preestablished operating parameters as set at the factory, automatic machine adjustment procedures are initiated and/or automatic service alerts are issued. The ability to constantly monitor the velocity profile throughout the machine enables preventative maintenance to occur and worn drive rolls, idler rolls and other transport devices can be replaced before catastrophic failure.

U.S. Pat. No. 5,237,521 discloses a system for determining the cumulative position and periodic average velocity of a rotating body having an incremental encoder, operatively connected to the body, for generating a series of periodic signals indicative of rotation of the body. The system also includes a high frequency clock for generating clock pulses at a frequency clock for generating clock pulses at a frequency greater than the maximum frequency of the encoder signal, and a timer for controlling the total time of a predetermined sample interval. Also included in the device is a counter for accumulating the number of integral encoder signal cycles that have been completed, an arithmetic logic unit for determining the size of a fractional portion of an encoder signal cycle that was completed between the last integral encoder cycle and the end of the sample interval. Subsequently, the number of integral encoder signal cycles is added to the fractional portion of an encoder cycle to determine the total number of encoder signal cycles completed, whereby the total is then multiplied by an encoder position conversion factor to determine the cumulative position of the rotating body or belt driven therefrom.

SUMMARY OF INVENTION

Briefly stated, and in accordance with one aspect of the present invention, there is provided a method for accurately determining velocity variations of a moving surface that causes a motion quality defect, comprising: moving the surface using a drive roll having an encoder thereon; measuring output pulses, from the encoder, over time that reflect the velocity variations of the surface; translating the output pulses of the encoder into individual frequency of variations of the surface velocity; and determining a motion quality defective member using the individual frequency of variations.

Pursuant to another aspect of the present invention, there is provided an apparatus for accurately determining velocity variations of a moving surface that causes a motion quality defect, comprising: a drive roll for moving the surface; an encoder on the drive roll to precisely monitor the velocity of the surface, said encoder having output pulses being measured over time; means for converting the output pulses of the encoder to velocity variations in frequency of the surface; a defective member causing the motion quality defect; and means for identifying the defective member causing the motion quality defect using the velocity variations in frequency of the surface.

Pursuant to another aspect of the present invention, there is provided an electrophotographic printing machine for accurately determining a velocity variation of a moving surface that causes a motion quality defect, comprising: a drive roll for moving the surface; an encoder, operatively connected to the drive roll to precisely monitor the velocity of the surface, the encoder having output pulses being measured over time; a converter to translate the output pulses of the encoder to the velocity variation in frequency of the surface; and a defective member causing the motion quality defect being identified using the velocity variation in frequency of the surface.

BRIEF DESCRIPTION OF THE DRAWINGS

Other features of the present invention will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 4:
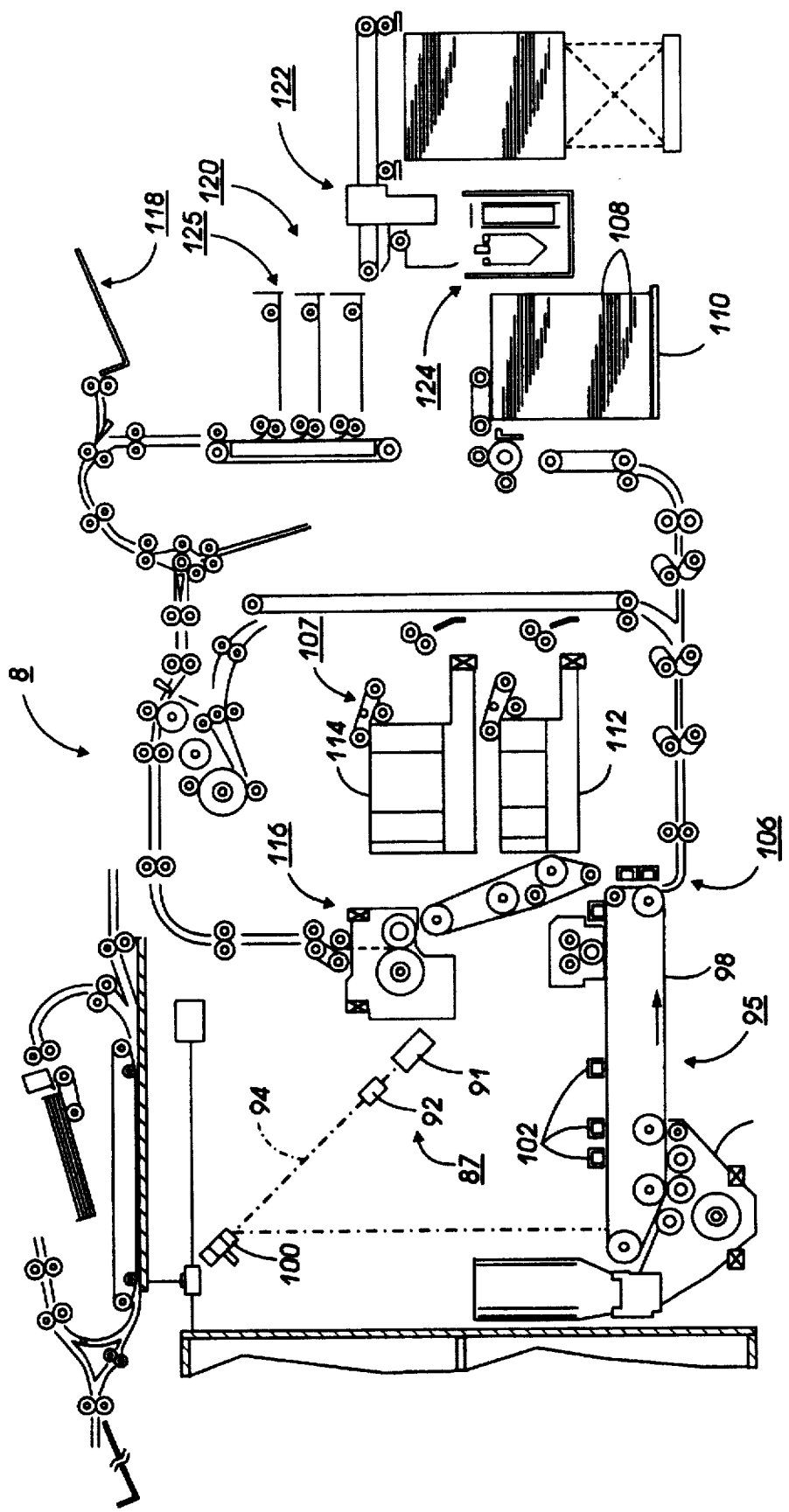
FIG. 4 is a schematic illustration of a printing apparatus incorporating the inventive features of the present invention.

Reference is now made to the drawings where the showings are for the purpose of illustrating a preferred embodiment of the invention and not for limiting same, the various processing stations employed in the printing machine illustrated in FIG. 4 will be briefly described.

Referring now to FIG. 4, printer section 8 comprises a laser type printer and for purposes of explanation is separated into a Raster Output Scanner (ROS) section 87, Print Module Section 95, Paper Supply section 107, and Finisher 120. ROS 87 has a laser, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at 107. Media 108, as will appear, may comprise any of a variety of sheet sizes, types, and colors. For transfer, the print media is brought forward in timed registration with the developed image on photoreceptor 98 from either a main paper tray 110 or from auxiliary paper trays 112, or 114. The developed image transferred to the print media 108 is permanently fixed or fused by fuser 116 and the resulting prints discharged to either output tray 118, or to output collating trays in finisher 120. Finisher 120 includes a stitcher 122 for stitching (stapling) the prints together to form books, a thermal binder 124 for adhesively binding the prints into books and a stacker 125. A finisher of this type is disclosed in U.S. Pat. Nos. 4,828,645 and 4,782,363 whose contents are hereby incorporated by reference.

Figure 1:
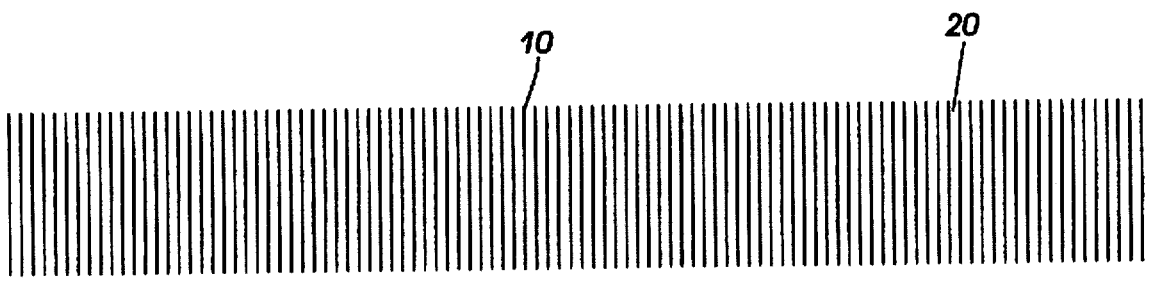
FIG. 1 is an example of a test target area to determine the motion quality of a photoreceptor.

Reference is now made to FIG. 1, which shows an example of an area used by a technical representative on a motion quality test target to check the motion quality of the photoreceptor. The vertical black lines 10 and white lines 20 are the same width and evenly spaced on the test target at some rate of speed. For example, 100 line pairs per inch. This test target is stored electronically on the printing machine (see FIG. 4). When this test target is viewed on an output print, there should be no noticeable difference in spacing between the lines 10, 20. When the ROS 87 (see FIG. 4) applies these lines 10, 20 to the photoreceptor surface at a very exact rate of speed, only a variation in the photoreceptor velocity effects the spacing between the lines 10, 20. As the photoreceptor velocity varies, the spacing between the lines varies. When the photoreceptor velocity is slower than nominal, the lines 10, 20 are closer together (i.e. giving the appearance, to the naked eye, of a dark area or band when printed on the target). And, when the photoreceptor velocity is faster than nominal, the lines are farther apart (i.e. giving the appearance, to the naked eye, of a light area or band when printed on the target). This is called banding. The spatial distance between these bands is measured by the technical representative. The technical representative compares this measured value to a predetermined list of values for "banding" (see Chart A in the Appendix) to identify the source of the motion quality defect (e.g. a drive component). In reality, it is very difficult to measure the spatial distance using present techniques because the spatial difference is difficult to determine accurately because of the blurred or shaded regions that appear on the print of the half-tones.

The present invention provides a method to accurately diagnose continuous low frequency motion quality defects by a technical representative in a quick and precise process. Thus, enabling accurate diagnosis replacement of the actual source of the motion quality defect. Print engines are often equipped with shaft encoders to precisely monitor the photoreceptor velocity. The instantaneous variation of the encoder output reflects changes in photoreceptor velocity and a defective drive component causes a variation in the photoreceptor velocity. In the present invention, by electronically measuring the changes of the encoder output pulses over time, (for instance by a frequency to voltage converter), existing software techniques are used to perform a spectral decomposition of the data by means of a Fast Fourier Transform (see "The Measurement of Time-Varying Phenomena Fundamentals and Applications", pgs. 2–4, by Edward Magiab and Donald Blomquist, and "The Fundamentals of Signal Analysis", Appendix A, pgs. 53–57, for a detailed description of Fast Fourier Transform). In the present invention, the photoreceptor velocity data is transformed into velocity variations occurring in the frequency domain, the velocity variation at each frequency can be compared to predetermined limits (e.g., as shown in Chart A in the Appendix). When this limit is exceeded, the component that generates that frequency is output to the technical representative for replacement. The software to do the data analysis is maintained on board the printer or the data is made available at a port or in a like manner. This data port is accessible by the technical representative, with a portable PC (personal computer), for example, containing the required software. The present invention dramatically reduces the time required to diagnose the source of motion quality image defects, and improves accuracy in diagnosis, thus, increasing machine up time and customer satisfaction.

Figure 2:
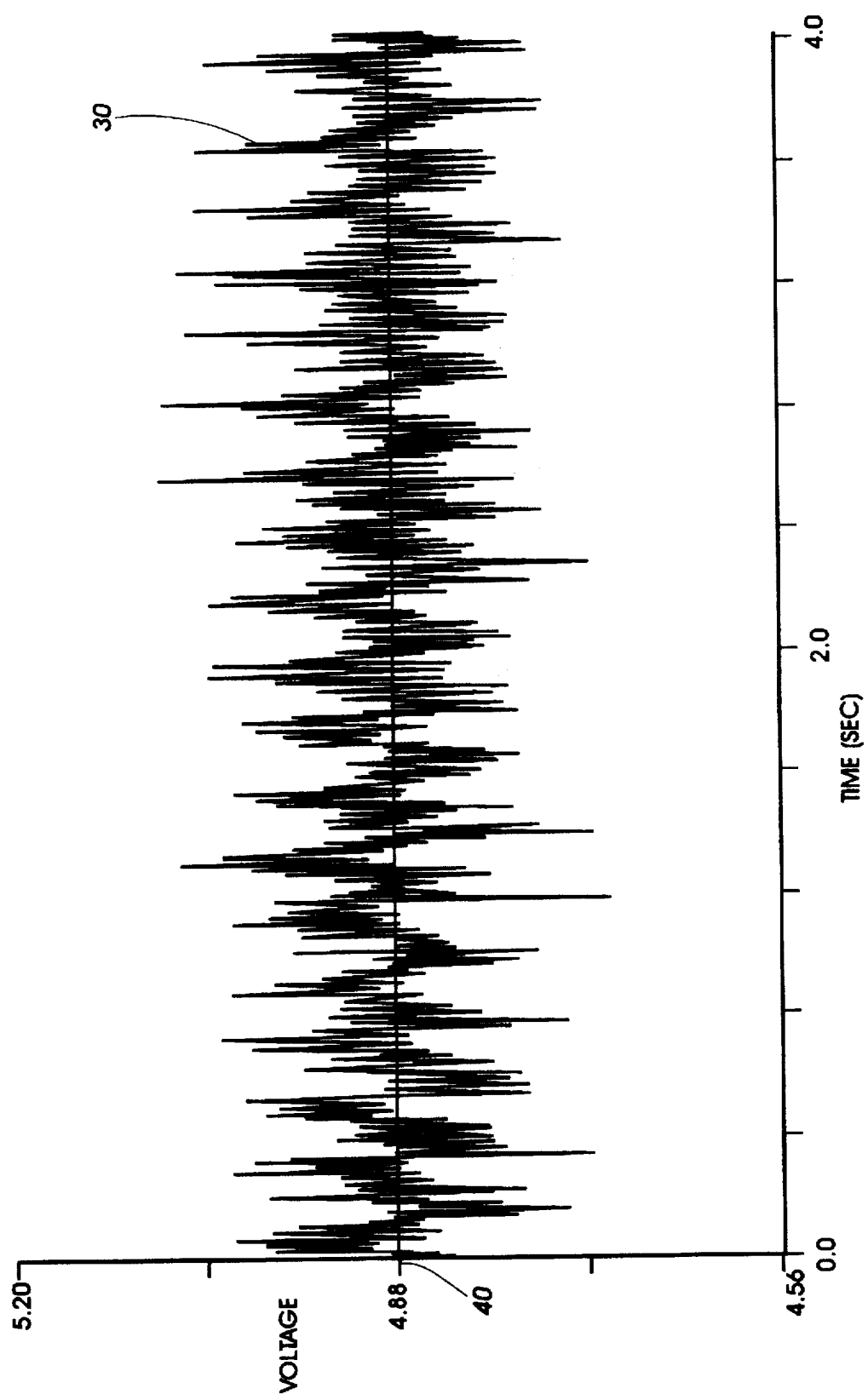
FIG. 2 is a graphical depiction of an output signal of an encoder translated in terms of voltage relative to time, using the present invention.

Reference is now made to FIG. 2, which graphically shows the voltage relative to time, generated using the present invention. This figure graphically illustrates an example of the output signal 30 (as a time based measurement) from a rotary encoder, of the photoreceptor velocity, after processing, that changes the output signal to voltage.

With continuing reference to FIG. 2, the centerline 40 indicates the average voltage of 4.88 volts over a time of four seconds in this example. The theoretical nominal photoreceptor velocity is 29.65 inches/second, which is equivalent to 4.88 volts. The signal variation above and below the nominal voltage is how all the individual velocity variations generated by the individual components are integrating together.

Figure 3:
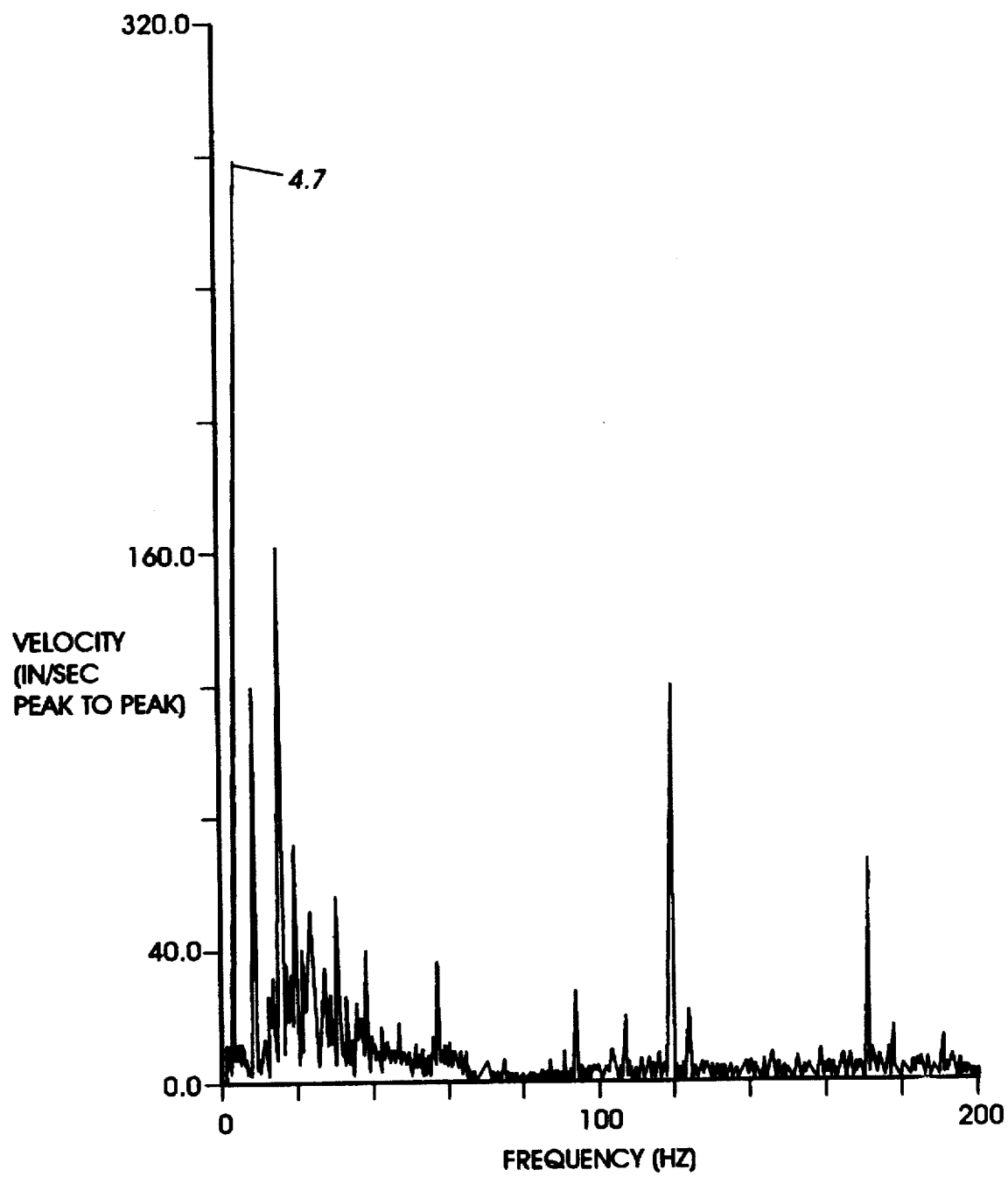
FIG. 3 is a graphical depiction of a photoreceptor peak to peak velocity variation vs. frequency, generated using the present invention.

Reference is now made to FIG. 3, which graphically shows the photoreceptor peak to peak velocity variation (milli-inch per second) vs. frequency (Hz), generated using the present invention. FIG. 3 shows an example of the output signal from a rotary encoder after it has been processed changing its signal to a voltage (see FIG. 2) and then processed further changing the voltage to frequency (e.g. using a Fast Fourier Transform). The theoretical nominal photoreceptor velocity variation is equal to 0.0 milli-inches per second. The frequencies that have the highest amplitude (shown on the y-axis of the graph) are used to identify the source of motion quality defect by comparing that frequency value to that of the frequency values shown in Chart A in the Appendix. Comparison of these values to one another yields the motion quality defect source(s).

Chart A in the Appendix provides the predetermined sources of variations in velocity that indicate sources of image quality defects on a printer machine (e.g. due to defective drive components) for comparison to actual data obtained in the present invention. The column entitled "Banding" is the distance measured between dark bands on the image quality test target print (see the simulated "banding" in FIG. 1). The column entitled "Frequency", provides predetermined values for characteristic frequency of parts for comparison to the actual frequency values of parts identified from the Frequency vs. Photoreceptor Velocity (after fast Fourier transform analysis) graph shown in FIG. 3.

With continuing reference to FIG. 3, the value on the graph that has the greatest amplitude corresponds with the frequency value of 4.7 Hz. Using Chart A from the Appendix, this value corresponds to the characteristic frequencies that can be generated by the photoreceptor drive pulley, photoreceptor drive coupling; photoreceptor drive roll; and prefuser drive pulley when they are the source of the motion quality defect. These are the drive components the technical representative will focus on in resolving the customer's motion quality problem.

In prior art methods, variations in photoreceptor velocity can affect large half tones on the prints. For example, at a low 4.7 Hz velocity variation, mentioned above, other frequencies are forced to band, making prior art manual measurements of banding very difficult. Using the prior art, the multiple frequencies appear to be single frequency band at 13.1 mm. Using Chart A in the Appendix, banding at 13.1 mm would lead the technical representative to identify the source of the motion quality defect as the "photoreceptor stripper roll" rather than the choice of the "photoreceptor drive pulley, photoreceptor drive coupling; photoreceptor drive roll; and/or prefuser drive pulley" (at the 4.7 Hz value, indicated by the present invention). This is an example of how the prior art system can mislead the technical representative such that a wrong diagnosis is made. Whereas, the present invention prevents misdiagnosis and reduces customer down time.

In recapitulation, the present invention utilizes a method wherein an encoder measures an output signal of the photoreceptor velocity (as a time based measurement) from a rotary encoder, after processing, that changes the output signal to voltage. The voltage value is then further processed changing the voltage to a frequency variation value (e.g. using a Fast Fourier Transform). The frequency variation value generated by the present invention is compared to a predetermined set of frequency values for drive components. A match between the predetermined value within a tolerance identifies the source of the motion quality defect. This method accurately measures the photoreceptor velocity variations enabling proper diagnosis of the source of the motion quality defect and thus, reduces customer down time.

It is, therefore, apparent that there has been provided in accordance with the present invention, a printer on-line diagnostics for continuous low frequency motion quality defects that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

APPENDIX
Chart A
Sample Machine Band at xxxxRPM

| FREQUENCY (Hz) | BANDING (mm) | SOURCE |
| --- | --- | --- |
| 2.8 | 268.0 | Dev Drive 73T Pulley & Coupling Run Out |
| 3.1 | 243.4 | Fuser 51T Gear Idler Run Out Frequency |
| 3.2 | 238.6 | Fuser Drive 65T Pulley,50T Gear & Coupling |
| 3.2 | 238.6 | Fuser Drive Gear SOT & Roll Run Out Frequency |
| 4.1 | 182.9 | Cleaner Drive 36T Pulley Run Out Frequency |
| 4.5 | 168.3 | Toner Mix 54T Idler Gear Run Out Frequency |
| 4.5 | 165.3 | Dev Housing 54T Hex Idler Gear Run Out Frequency |
| 4.5 | 167.6 | Decurler 3 mm 62T Pulley Run Out Frequency |
| 4.5 | 167.6 | Cleaner Drive 33T Pulley Run Out Frequency |
| 4.5 | 167.6 | Prefuser 21T Pulley Run Out Frequency |
| 4.7 | 161.5 | Developer Drive 70 mm Idler Run Out Frequency |
| 4.7 | 159.7 | Prefuser 20T Pulley Run Out Frequency |
| 4.7 | 159.7 | P/R 36T Pulley, Coupling & Roll Run Out Frequency |
| 5.0 | 151.7 | Prefuser Idler Run Out Frequency |
| 6.0 | 125.0 | P/R Ass'y Tensioner Roll Run Out Frequency |
| 6.0 | 124.6 | Dev Dr Double 40T&59T Gear Idler Run Out |
| 6.0 | 124.6 | Dev Roll #2 40T Drive Gear Run Out Frequency |
| 6.0 | 124.6 | Dev Roll #2 &3 40T Gear Idler Run Out Frequency |
| 27.9 | 27.0 | CHM Duplex Inverter Idler Run Out Frequency |
| 30.0 | 25.1 | Motor Armature & Pinion Run Out Frequency |
| 57.5 | 13.1 | P/R Ass'y Stripper Roll Characteristic Frequency |
| 94.3 | 8.0 | Prefuser 20T Pulley Characteristic Frequency |
| 94.3 | 8.0 | Prefuser 21T Pulley Mesh Frequency |

It is claimed:

1. A method for accurately determining velocity variations of a moving surface that causes a motion quality defect, comprising:

moving the surface using a drive roll having an encoder thereon;

measuring output pulses, from the encoder, over time that reflect the velocity variations of the surface directly at the surface;

translating the output pulses of the encoder into individual frequency of variations of the surface velocity enabling distinction between a single linear source and multiple linear sources causing the motion quality defect; and determining a motion quality defective member using the individual frequency of variations.

2. A method as recited in claim 1, further comprising the step of replacing the motion quality defective member.

3. A method as recited in claim 2, wherein the step of translating the output pulses comprises performing a spectral decomposition of the output pulses measured, using a Fast Fourier Transform.

4. A method as recited in claim 2, wherein the determining step comprises comparing the individual frequency of variations to predetermined variations in frequency identifying a defective member.

5. An apparatus for accurately determining velocity variations of a moving surface that causes a motion quality defect, comprising:

a drive roll for moving the surface;

an encoder on said drive roll to precisely monitor the velocity of the surface, said encoder having output pulses being measured over time directly at the surface;

means for converting the output pulses of said encoder to velocity variations in frequency of the surface enabling distinction between a single linear source and multiple linear sources causing the motion quality defect;

a defective member causing the motion quality defect; and means for identifying said defective member causing the motion quality defect using the velocity variations in frequency of the surface.

6. An apparatus as recited in claim 5, wherein the output pulses are electronically measured.

7. An apparatus as recited in claim 6, wherein variations in the velocity of the surface being defined by instantaneous variations of the output pulses of said encoder.

8. An apparatus as recited in claim 7, wherein the electronically measured output pulses of said encoder are converted to the velocity variations in frequency of the surface.

9. An apparatus as recited in claim 8, wherein said converting means comprises performing a spectral decomposition of the output pulses of said encoder using a Fast Fourier Transform to convert the electronically measured output pulses of said encoder to the velocity variations in frequency of the surface.

10. An apparatus as recited in claim 9, wherein the Fast Fourier Transform provides separate frequency of variations in the velocity of the surface.

11. An apparatus as recited in claim 10, wherein said identifying means comprises comparing the velocity variations in frequency of the surface to predetermined velocity variations in frequency for the defective member enabling accurate diagnosis of said defective member causing the motion quality defect.

12. An apparatus as recited in claim 11, wherein said defective member comprises a drive component.

13. An electrophotographic printing machine for accurately determining a velocity variation of a moving surface that causes a motion quality defect, comprising:

a drive roll for moving the surface;

an encoder, operatively connected to said drive roll to precisely monitor the velocity of the surface, said encoder having output pulses being measured over time directly at the surface;

a converter to translate the output pulses of said encoder to the velocity variation in frequency of the surface enabling distinction between a single linear source and multiple linear sources causing the motion quality defect; and a defective member causing the motion quality defect being identified using the velocity variation in frequency of the surface.

14. A printing machine as recited in claim 13, wherein the output pulses are electronically measured.

15. A printing machine as recited in claim 14, wherein the variation in the velocity of the surface being defined by instantaneous variations of the output pulses of said encoder.

16. A printing machine as recited in claim 15, wherein the electronically measured output pulses of said encoder are converted to velocity variations in frequency of the surface.

17. A printing machine as recited in claim 16, wherein said converter translates the electronically measured output pulses of said encoder to the velocity variation in frequency of the surface using a spectral decomposition of the output pulses by a Fast Fourier Transform.

18. A printing machine as recited in claim 17, wherein the Fast Fourier Transform provides separate frequency of variations in the velocity of the surface.

19. A printing machine as recited in claim 18, wherein the velocity variation in frequency of the surface being compared to predetermined velocity variations in frequency for said defective member enabling accurate diagnosis of the motion quality defect.

20. A printing machine as recited in claim 19, wherein said defective member comprises a drive component.

* * * * *